United States Patent
Strandjord

(10) Patent No.: US 7,869,052 B2
(45) Date of Patent: Jan. 11, 2011

(54) METHOD AND AMPLIFYING STAGE FOR SUPPRESSING MODULATION DISTORTION RATE SENSING ERRORS IN A RESONATOR FIBER OPTIC GYROSCOPE

(75) Inventor: Lee Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 48 days.

(21) Appl. No.: 12/479,609

(22) Filed: Jun. 5, 2009

(65) Prior Publication Data
US 2010/0309475 A1    Dec. 9, 2010

(51) Int. Cl.
G01C 19/72    (2006.01)
(52) U.S. Cl. ........................ 356/461; 356/463
(58) Field of Classification Search ............... 356/460, 356/461, 463
See application file for complete search history.

(56) References Cited

U.S. PATENT DOCUMENTS

| 5,289,258 A | * | 2/1994 | Szafraniec et al. | 356/460 |
| 5,459,575 A | * | 10/1995 | Malvern | 356/463 |
| 5,610,714 A | * | 3/1997 | Malvern et al. | 356/463 |

* cited by examiner

Primary Examiner—Patrick J Connolly
(74) Attorney, Agent, or Firm—Fogg & Powers LLC

(57) ABSTRACT

A device and a method for suppressing 2nd order harmonic distortion in a Resonator Fiber Optic Gyroscope includes driving a laser to generate at least one of a plurality of counter propagating laser beams traveling through a fiber optic resonator according to a modulated signal. The modulated signal can be represented by a polynomial having two terms, and each of the two terms is suitably multiplied by a coefficient and a constant. A modulation amplitude adjuster amplifies the modulation signal by an amplification factor as it is used to drive the laser. When the amplification factor is suitably chosen to represent a square root of a ratio of the constants, the total harmonic distortion in the RFOG is minimized.

6 Claims, 2 Drawing Sheets

METHOD AND AMPLIFYING STAGE FOR SUPPRESSING MODULATION DISTORTION RATE SENSING ERRORS IN A RESONATOR FIBER OPTIC GYROSCOPE

FIELD OF THE INVENTION

This invention relates generally to electronic gyroscopes and, more specifically, to instrumentation for implementing electronic gyroscopes.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a resonator fiber optic gyro (RFOG), the counter-propagating light beams are desirably monochromatic (e.g., in a single frequency) and circulate through multiple turns of the fiber optic coil and for multiple passes through the coil using a device that redirects light that has passed through the coil back into the coil again (i.e., circulates the light) such as a fiber coupler. The beam generating device modulates or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength is referred to as "on resonance" when the round trip resonator pathlength is equal to an integral number of wavelengths. A rotation about the axis of the coil produces a different pathlength for clockwise and counterclockwise propagation, thus producing a shift between the respective resonance frequencies of the resonator, and the frequency difference, such as may be measured by tuning the CW beam and CCW beam frequencies to match the resonance frequency shift of the closed optical path due to rotation, indicates the rotation rate.

The CW Laser inputs light into the resonator and the CW photodetector detects the CW output of the resonator. The electronics after the CW photodetector controls the CW laser frequency to a resonance frequency of the resonator. The resonance frequency is detected by modulating the laser frequency at $f_1$ and then demodulation the photodetector output at $f_1$. At the resonance frequency the photodetector signal at $f_1$ passes through zero amplitude. The CW integrator controls the laser frequency via the CW laser driver to the resonance frequency by adjusting the laser frequency until the output of the demodulator is zero. The modulation at $f_1$ is electronically summed with the CW integrator output by a summer. The CCW laser is controlled to the CCW resonance frequency in a similar manner, except it is common that the modulation frequency $f_2$ is different than $f_1$ to eliminate errors that arise with light from one direction of propagation in the resonator inadvertently couples into the other direction.

Rotation rate is proportional to the difference between the CW resonance frequency and the CCW resonance frequency. It is common practice that the amplitude of the outputs of the modulation generators are set to maximize the sensitivity of the resonator output to laser frequency deviations from resonance frequency. Most rotation sensing errors are minimized when the modulation amplitude is set at or near the maximum sensitivity. However, rotation sensing errors associated with harmonic distortion most prevalent in $2^{nd}$ order harmonics of the resonance frequency are simply amplified at the greater sensitivity, doing little to improve the performance of the RFOG.

An example of the interfering effects of the presence of a $2^{nd}$ order harmonic is evident in FIG. 1. In a plot 3 of the modulation as a function of phase, a pure sine fundamental 5 is added to its $2^{nd}$ order harmonic 7 to yield a new composite wave 9 that exhibits an apparent asymmetry about the x axis. This asymmetry appears as lower positive excursion in amplitude during the first half cycle and a higher negative excursion in amplitude during the second half cycle. This apparent asymmetry diminishes the accuracy of the RFOG by shifting the measured center frequency of the resonator. Because the difference between the clockwise and counter-clockwise resonance frequencies are the measure of the rotational acceleration in an RFOG, the presence of the $2^{nd}$ order harmonic degrades the performance of the RFOG.

What is needed in the art is an RFOG that is configured to eliminate or minimize the interfering effects of $2^{nd}$ order harmonics producing rotational errors.

SUMMARY OF THE INVENTION

A device and a method for suppressing 2nd order harmonic distortion in a Resonator Fiber Optic Gyroscope includes driving a laser to generate at least one of a plurality of counter propagating laser beams traveling through a fiber optic resonator according to a modulated signal. The modulated signal can be represented by a polynomial having two terms, and each of the two terms is suitably multiplied by a coefficient and a constant. A modulation amplitude adjuster amplifies the modulation signal by an amplification factor as it is used to drive the laser. When the amplification factor is suitably chosen to represent a square root of a ratio of the constants, the total harmonic distortion in the RFOG is minimized.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The following detailed description of the invention is merely exemplary in nature and is not to limit the invention or the application and uses of the invention. Furthermore, there is no intention to be bound by any theory presented in the preceding background of the invention or the following detailed description of the invention.

Figure 1:
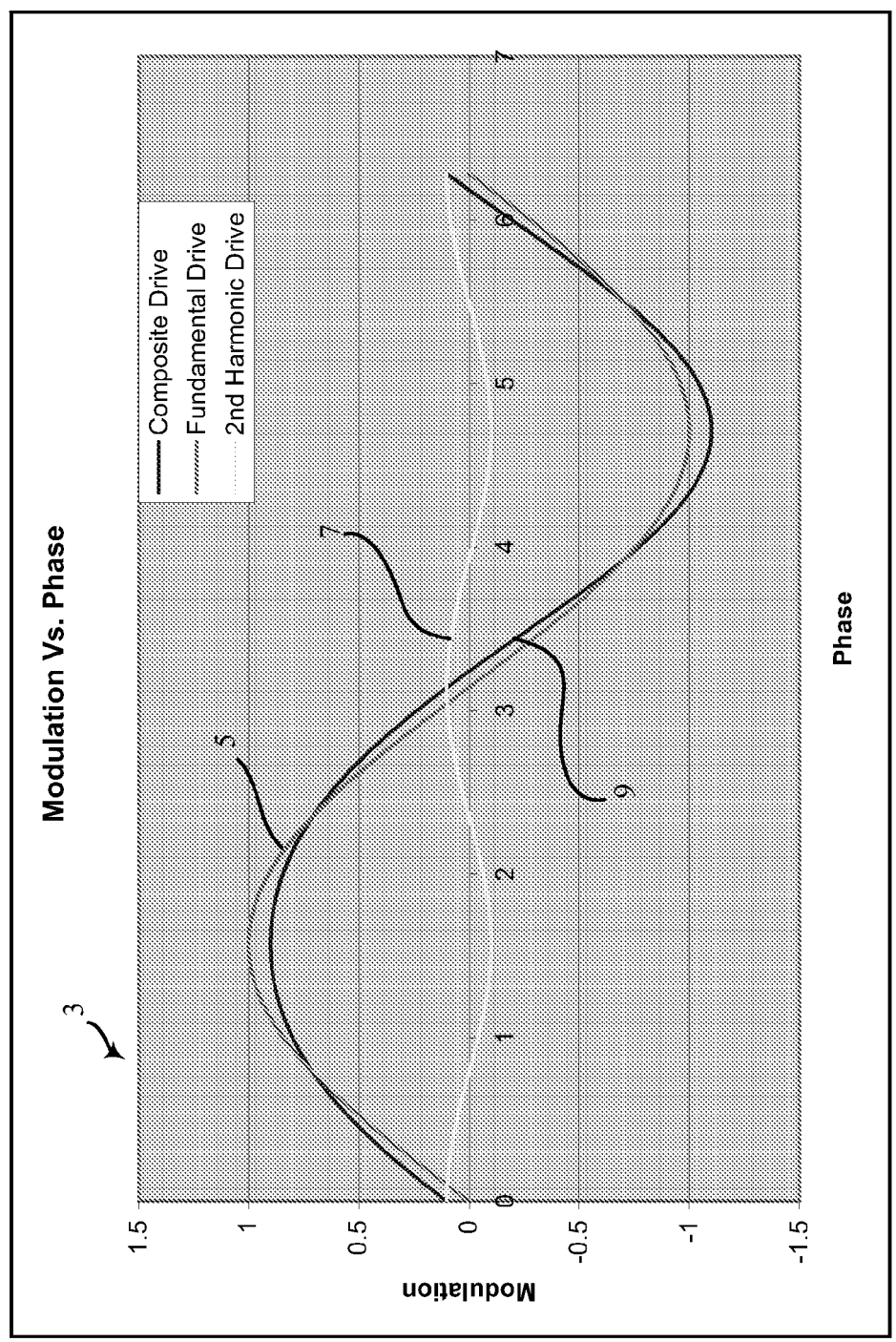
FIG. 1 is a graph to show the effect of harmonic distortion arising from the $2^{nd}$ order harmonic.
Figure 2:
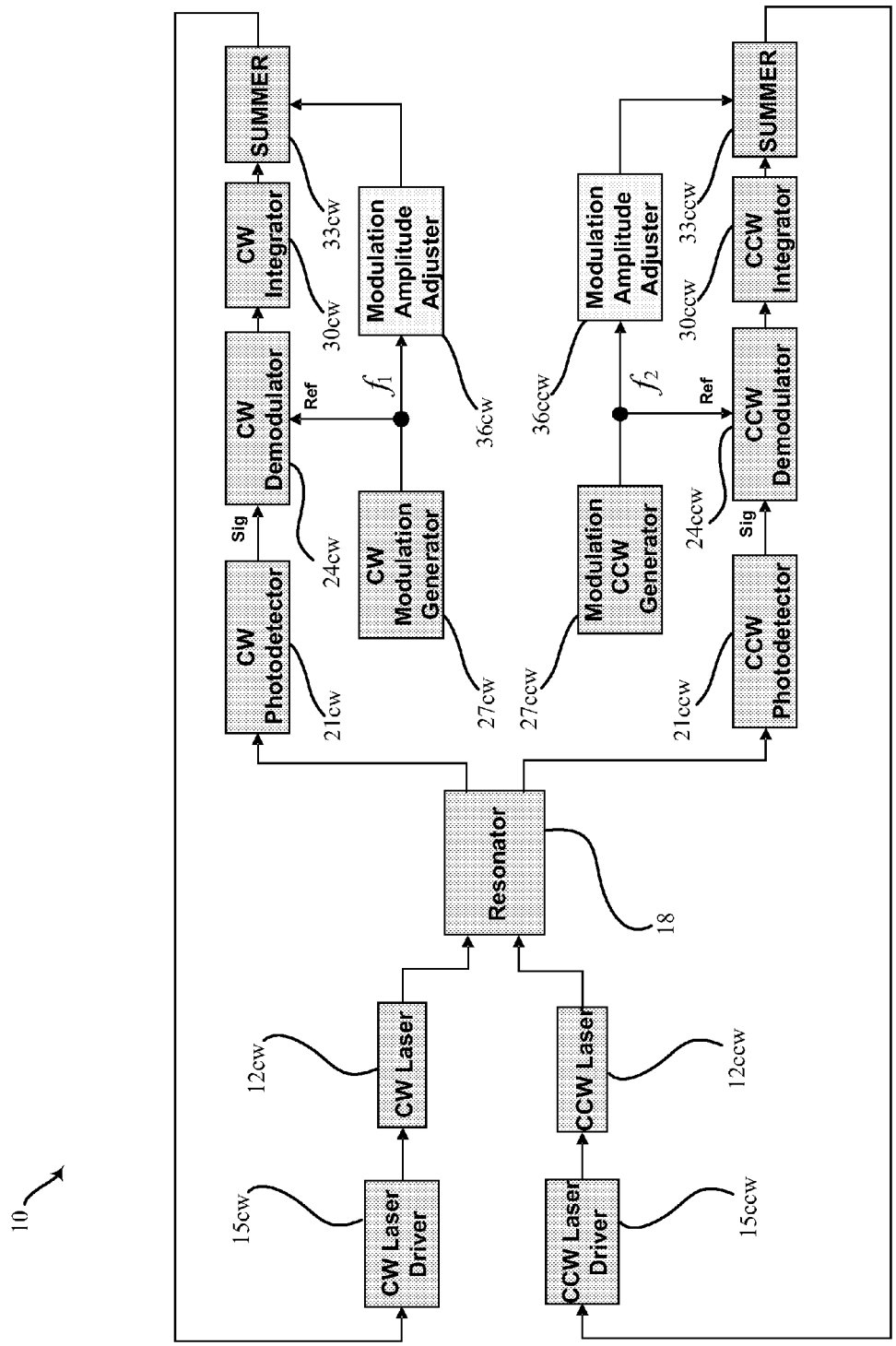
FIG. 2 is a schematic diagram of a RFOG exploiting the modulation amplitude adjuster to minimize $2^{nd}$ order harmonic distortion.

Referring now to the drawings, FIG. 2 is a schematic diagram of a resonator fiber optic gyro (RFOG) 10 in accordance with an exemplary embodiment of the present invention. The RFOG 10 includes each of a pair of lasers 12cw and 12ccw assigned respectively as the clockwise and counter clockwise light sources respectively, assigned thus to indicate the direction which the beam each generates will enter and travel through a fiber optic ring resonator 18. Each light beam emanates from the lasers 12cw and 12ccw, each has a frequency, and each is modulated at a frequency in accord with signals originating at each of a pair of laser drivers 15cw and 15ccw.

Optical ring resonators 18 include a waveguide in a closed loop coupled to one or more input and output waveguides. Most often, the resonator 18 is a single fiber optic strand wound to form a spiral, and then back on itself forming a tube.

having first and second ends. When light of the appropriate frequency is coupled to the loop by the input waveguide, it builds up in intensity over multiple round-trips due to constructive interference. The light can then be picked up by a detector. Since only some wavelengths resonate in the loop, the resonator also functions as a filter.

Thus the light beams each enter opposite ends to travel around the resonator in their respective directions, clockwise and counter clockwise. At each of the first and second ends, a photodetector 21cw, 21ccw detects the light wave traveling out of the resonator 18 in each of the two noted directions.

As earlier noted, the lasers 12cw and 12ccw, each produce a light beam that is modulated at a frequency in accord with signals originating at each of a pair of laser drivers 15cw and 15ccw. In turn, the laser drivers receive a signal that generates a modulating sine wave for purposes of modulating the frequency of the laser beams. For each direction, the signal is sinusoidally frequency-modulated according to a modulation generator 27cw, 27ccw, the output at each photodetector 21cw, 21ccw must likewise be demodulated at a demodulator 24cw, 24ccw at the same frequency of the modulating sine wave. Thus, the demodulator 24cw, 24ccw coupled to the photodetector 21cw, 21ccw demodulates the outputs of the photodetector 21cw, 21ccw at the demodulator 24cw, 24ccw to measure resonance centers indicated by the light outputs of the CW and CCW beams.

The demodulated signal is approximately proportional to the frequency difference between the laser frequency and the resonance center. When the average laser frequency is on resonance center the demodulated signal will be zero. An integrator 30cw, 30ccw configures the signal to provide, in real time, an output signal that is the time integral of the input signal. Among many other applications, integrators today form the basis for extracting information from digital signals corrupted by noise.

One advantage of using this technique of two (or in some instances three) lasers is that it is straightforward to have the CW beam frequency adjusted to a different resonance of the resonator than the CCW beam frequency is adjusted to. Since the resonance frequencies of the ring optical resonator appear periodically every time an integer number of wavelengths fits into the optical pathlength of the resonator, the CW and CCW beam frequencies can be tuned to, for example, the frequencies where n and (n+1) wavelengths fit into the CW and CCW paths respectively, where n represents the integer number of wavelengths of light traversed in a round trip of the optical pathlength of the resonator. This alleviates rotation rate errors that can arise due to the backscattering of light from one beam into another. However, using a different number of wavelengths that form the different beams does introduce the optical pathlength of the ring resonator into the rotation rate measurement. Errors arising from the backscattering can be alleviated by incorporating a third laser beam (e.g., in the CCW direction at a frequency where n−1 wavelengths fit into the CCW optical pathlength of the resonator).

In either of the two or three laser configurations, rotation sensing errors can occur due to harmonic distortion. Harmonic distortion is nonlinear distortion characterized by the output of harmonics in a signal waveform that do not correspond with the input signal waveform. Harmonic distortion may be introduced at several components within the system but generally occur at modulation of the signal.

Rotational sensing errors are often associated with harmonic distortion of the modulation and most perniciously by the 2nd harmonic. The inventor has noted that the effects of harmonic distortion by introduction of the 2nd harmonic can be greatly reduced or eliminated when using a designated modulation amplitude. The inventive device, therefore injects a suitably amplified modulation sinusoid into the signal at the modulation amplitude adjuster 36cw, 36ccw by allowing some increase in various rotation sensing errors the error due harmonic modulation distortion can be minimized.

The amplification, either positive or negative of the signal emitted by the modulation generator 27cw, 27ccw occurs at the Modulation Amplitude Adjuster 36cw, 36ccw and is according to constant amplification factor derived prior to construction.

To understand the nature of the modulation, the modulation process is modeled using a resonance function with a polynomial. Assuming a perfectly symmetric resonance function, the distortion in question is only introduced at even orders in a selected polynomial. Therefore, the polynomial must be selected such that to have be a 4th order polynomial with minus sign to approximate resonance function such that its second derivative changes its sign. A function that satisfies this condition is:

$$y = k_2 x^2 - k_4 x^4 \quad \text{(Equation 1a)}$$

Because the polynomial will be based upon at least one sinusoid, the function can be so expressed. The resulting function represents the modulation signal at a fundamental frequency and a second harmonic component due to harmonic distortion with coefficients $a_1$ and $a_2$ which represent the relative magnitude of the modulation signal at the fundamental frequency and second harmonic component respectively.

$$x = a_1 \sin(\omega t) + a_2 \cos(2\omega t) \quad \text{(Equation 1b)}$$

Using the polynomial to model the modulation and solving for the resulting wavelength at the frequency and at the 2nd harmonic yields:

$$y|_\omega = -k_2 a_1 a_2 \sin(\omega t) + 2k_4 a_1^3 a_2 \sin(\omega t) \quad \text{(Equation 2)}$$

This polynomial expressed in Equation 2 models the distortion in the resonator output signal at the fundamental frequency (assuming sine wave demodulation). Examining the equation indicates that this distortion signal is that of an existing bias error since the modulation was set to be centered with the resonance function. The bias error goes to zero when the amplitude of the modulation is selected to be:

$$a_1 = \sqrt{\frac{k_2}{2k_4}} \quad \text{(Equation 3)}$$

Designing the circuit to exploit this fact is aided by the fact that the coefficient of the amplification is a constant and independent of the 2nd harmonic modulation amplitude. For that reason, the simple amplification at the fixed amplitude will adequately suppress 2nd order harmonic distortion.

Returning, then, to FIG. 2, the output of the modulation generators 27cw, 27ccw is then amplified at the modulation amplification adjuster 36cw, 36ccw by a factor such that the amplitude of the modulation signal is $$a_1 = \sqrt{\frac{k_2}{2k_4}}$$

provided to the summer 33cw, 33ccw for suitable addition to the output of an integrator 30cw, 30ccw, which integrates the output of the demodulator 24cw, 24ccw as that signal is demodulated as described above. By means of adding the amplified modulation signal at the summer 36cw, 36ccw, the 2nd harmonic distortion is driven to near zero levels within the feedback loop.

While the preferred embodiment of the invention has been illustrated and described, as noted above, many changes can be made without departing from the spirit and scope of the invention. For example, a second clockwise or counterclockwise circuit might be added with its own modification amplitude adjuster for suppressing harmonics in that third circuit. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for suppressing $2^{nd}$ order harmonic distortion in a Resonator Fiber Optic Gyroscope, the device comprising:
   a laser driver for driving at least one of a plurality of counter propagating laser beams traveling through a fiber optic resonator, the driving occurring in accord with a modulated signal;
   a modulation generator to produce the modulation signal; and
   a modulation amplitude adjuster for amplifying the modulation signal such that the final amplitude is $$a_1 = \sqrt{\frac{k_2}{2k_4}}$$

where the fiber optic resonator outputs a signal according to $$y|_\omega = -k_2 a_1 a_2 \sin(\omega t) + 2k_4 a_1^3 a_2 \sin(\omega t)$$

the modulation amplitude adjuster being interposed in a signal path between the laser driver and the modulation generator.

2. The device of claim 1 wherein:
   the laser driver includes at least a one laser driver for each of a clockwise propagating laser beam and a counter-clockwise propagating laser beam within the fiber optic resonator;
   the modulation generator includes at least one modulation generator for each of a clockwise propagating laser beam and a counter-clockwise propagating laser beam within the fiber optic resonator; and
   the modulation amplitude adjuster includes at least one modulation amplitude adjuster for each of a clockwise propagating laser beam and a counter-clockwise propagating laser beam within the fiber optic resonator.

3. The device of claim 2 further including:
   at least one of each of an additional laser driver, an additional modulation generator, and an additional amplitude adjuster for an additional laser beam propagating in either of a clockwise or counter-clockwise direction through the fiber optic resonator.

4. A method for suppressing $2^{nd}$ order harmonic distortion in a Resonator Fiber Optic Gyroscope, the method comprising:
   receiving an output signal of a wave propagated in a first direction from a fiber optic resonator, the output generally according to the polynomial $$y|_\omega = -k_2 a_1 a_2 \sin(\omega t) + 2k_4 a_1^3 a_2 \sin(\omega t)$$

amplifying the modulation signal such that the final amplitude is $$a_1 = \sqrt{\frac{k_2}{2k_4}}$$

the to generate an adjusted modulation signal and;
   driving a laser to propagate a beam in a first direction into the fiber optic resonator according to the adjusted modification signal.

5. The method of claim 4, wherein the receiving the output signal of a wave propagated in a first direction from a fiber optic resonator further includes:
   receiving the output signal at a photodetector;
   demodulating the output signal according to the output of the modulation generator to generate a demodulate output signal; and
   integrating the demodulated output signal to generate an integrated demodulated output signal.

6. The method of claim 5, wherein the driving the laser to propagate the beam in a first direction includes:
   summing the integrated demodulated output signal with the adjusted modulation signal to drive the laser.

* * * * *